(12) United States Patent
Laugwitz et al.

(10) Patent No.: US 8,578,271 B2
(45) Date of Patent: *Nov. 5, 2013

(54) NESTED ROADMAP NAVIGATION IN A GRAPHICAL USER INTERFACE

(75) Inventors: Bettina Laugwitz, Ludwigshafen (DE); Christopher Ronnewinkel, Heidelberg (DE); Susann Stieler, Leimen (DE)

(73) Assignee: SAP AG, Walldorf (DE)

( * ) Notice: Subject to any disclaimer, the term of this patent is extended or adjusted under 35 U.S.C. 154(b) by 672 days.

This patent is subject to a terminal disclaimer.

(21) Appl. No.: 12/634,857

(22) Filed: Dec. 10, 2009

(65) Prior Publication Data

US 2011/0145738 A1 Jun. 16, 2011

(51) Int. Cl.
*G06F 3/00* (2006.01)
(52) U.S. Cl.
USPC .......................... 715/712; 715/708; 715/713
(58) Field of Classification Search
USPC .......................... 715/712, 708, 713, 772, 810
See application file for complete search history.

(56) References Cited

U.S. PATENT DOCUMENTS

| 6,781,610 | B2 * | 8/2004 | Os et al. ................... | 715/764 |
|---|---|---|---|---|
| 7,581,186 | B2 | 8/2009 | Dowdy et al. | |
| 2006/0010399 | A1 * | 1/2006 | Lau ............................ | 715/853 |
| 2008/0066016 | A1 * | 3/2008 | Dowdy et al. ............. | 715/854 |
| 2008/0098327 | A1 * | 4/2008 | Berkovitz et al. .......... | 715/803 |
| 2008/0250317 | A1 * | 10/2008 | Evans ........................ | 715/712 |
| 2009/0235194 | A1 * | 9/2009 | Arndt et al. ................ | 715/772 |

OTHER PUBLICATIONS

"Script.aculo.us Fade Effects," Tutorials Point, Published Feb. 8, 2008, available at http://w w w .tutorialspoint.com/scriptaculo.us/scriptaculousfade_effect.htm. pp. 5-7 are screenshots of a code demonstration of the fade-in and fade-out effect.*
Free Software Foundation, Inc., Controlling the Display—Automatic Scrolling; GNU Emacs Manual pp. 64-65; Free Software Foundation, Inc., MA, USA; 2009 (http://www.gnu.org/software/emacs/manual/emacs.pdf).

* cited by examiner

*Primary Examiner* — Doon Chow
*Assistant Examiner* — Andrew T Chiusano

(57) ABSTRACT

Systems and methods for nested roadmap information navigation in a graphical user interface (GUI) where a sequence of items is generated and stored in a memory of a computer system. The sequence of items includes at least one compound item. A number of user interface (UI) elements are displayed in a GUI screen, wherein each UI element represents an item of the sequence of items, and wherein the UI elements are ordered according to the sequence of items. The displayed UI elements include a UI element representing a compound item of the sequence of items. The compound item could be selected as a currently active item. The UI element representing the selected compound item can gradually expand to display one or more new UI elements representing component items subordinate to the compound item. The first of the component items is automatically selected as a currently active item.

17 Claims, 8 Drawing Sheets

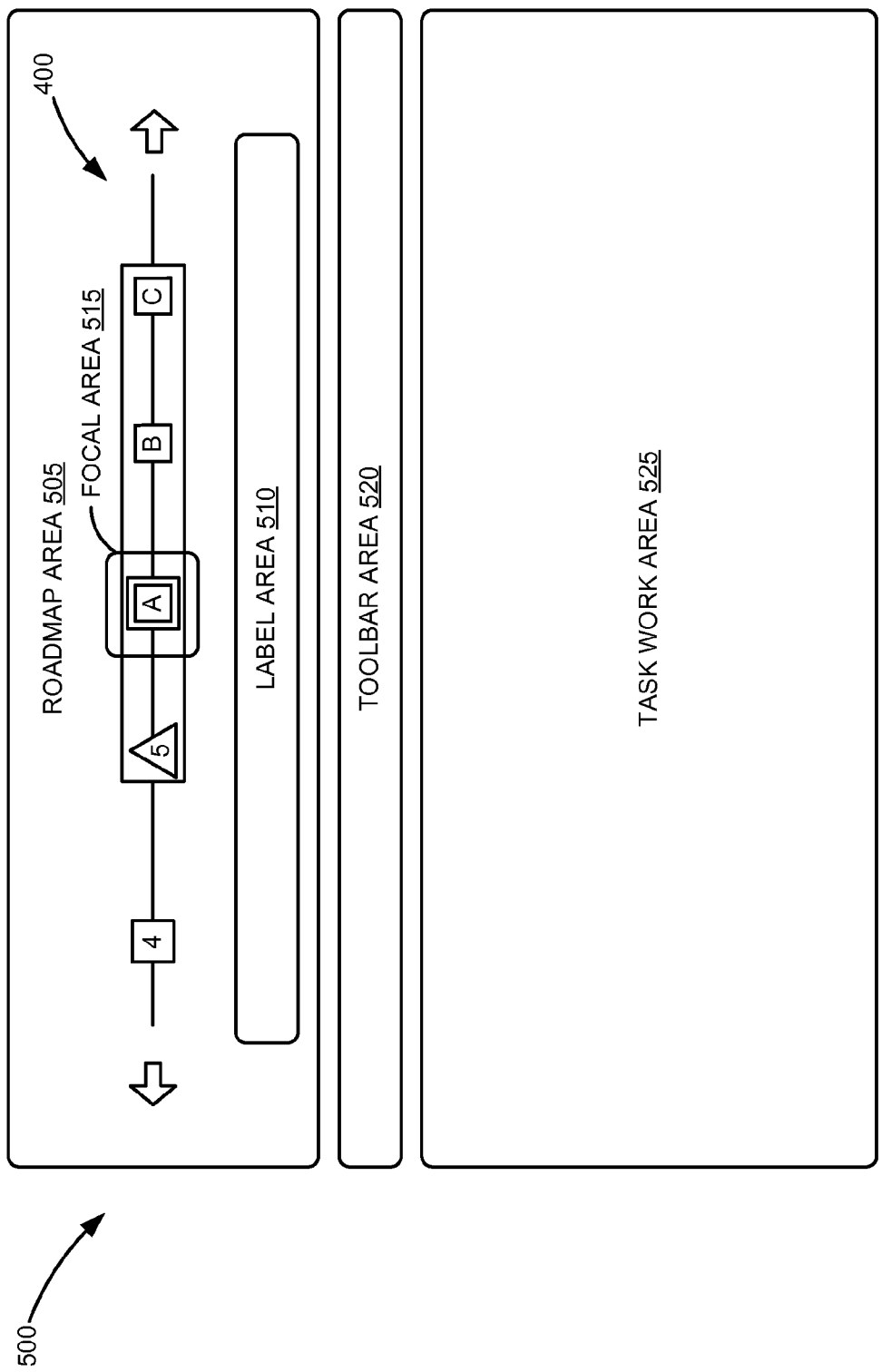

NESTED ROADMAP NAVIGATION IN A GRAPHICAL USER INTERFACE

TECHNICAL FIELD

The field of the invention relates generally to data processing and digital processing systems. More specifically, the invention is related to presentation of information and navigation in a graphical user interface.

BACKGROUND

Generally, modern computer applications, including business applications (e.g., enterprise resource planning (ERP) system applications, customer relationship management system (CRM) applications, etc.), implement graphical user interfaces to interact with users. The growing complexity of the functionality embedded in such applications, and the abundance of managed data present a significant challenge for the application developers to design efficient and detailed user interfaces within the limited space of display devices. Usually, users have to scroll and switch between a multitude of screens in their interaction with the applications to perform various tasks and to achieve desired results. In such a complex interface environment, it may be necessary to maintain user's attention to the task by tracking the work accomplished so far and keeping up-to-date plan about the next actions.

Many business applications implement wizards or other types of techniques to guide users during execution of sequences of tasks of a complex process. The tasks to be executed are displayed successively one after another in a graphical user interface (GUI). The execution of one task invokes an interface for execution of a next task. Often, a roadmap is displayed within the GUI to help users keep track of a task flow while accomplishing a complex process. Such roadmaps could be described as plans that contain tasks and dependencies for accomplishment of complex processes. Roadmaps help users to navigate between tasks, inform the users for the executed tasks and the forthcoming tasks, provide additional information associated with the tasks, etc.

Occasionally, the various types of roadmaps that are displayed in GUIs cannot show all tasks of a process within a single screen. Some business processes involve the execution of compound tasks consisting of one or more subordinate tasks. In such cases, the relevant roadmaps need to be displayed as dynamic tree-like structures that could change depending on user input. The navigation through a GUI roadmap with compound elements is necessary to achieve an overview of the tasks and the existing dependencies of a process.

The implementation of roadmaps in graphical user interfaces provides significant advantage to application users during execution of business processes or various system procedures. The roadmaps and other similar GUI tools offer guidance and additional information to facilitate the accomplishment of a particular action. However, users often have to scroll through roadmap controls and navigate between numerous screens to get the necessary information for accomplishment of a particular task, because the relevant data is not summarized in a single screen. This navigation or scrolling could cause inefficiency and uncertainty in user's actions. Thus, the overall user performance could be harmed, as well as the objective and subjective perception for usability of an application GUI.

SUMMARY

Various systems and methods for nested roadmap information navigation in a graphical user interface (GUI) are described herein. A sequence of items including at least one compound item is generated and stored in a memory of a computer system. A number of user interface (UI) elements are displayed in a GUI screen, wherein each UI element represents an item of the sequence of items, and wherein the UI elements are ordered according to the sequence. The displayed UI elements include a UI element representing a compound item from the sequence of items. The compound item could be selected as a currently active item. The UI element representing a selected compound item gradually expands to include in the GUI screen one or more new UI elements representing component items. The component items are subordinate to the selected compound item. One of the component items is automatically selected as a currently active item.

The displayed UI elements are automatically scrolled to move the UI element representing the currently active item at a focal position within the GUI screen area. When the UI elements scroll in one direction, a new UI element could be gradually brought into the GUI screen from the direction of scrolling. Furthermore, the scrolling could gradually remove a UI element in the opposite direction of the screen.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

FIG. 5 is a block diagram of a GUI for nested roadmap information navigation, according to one embodiment of the invention.

DETAILED DESCRIPTION

Embodiments of techniques for nested roadmap navigation in a graphical user interface (GUI) are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
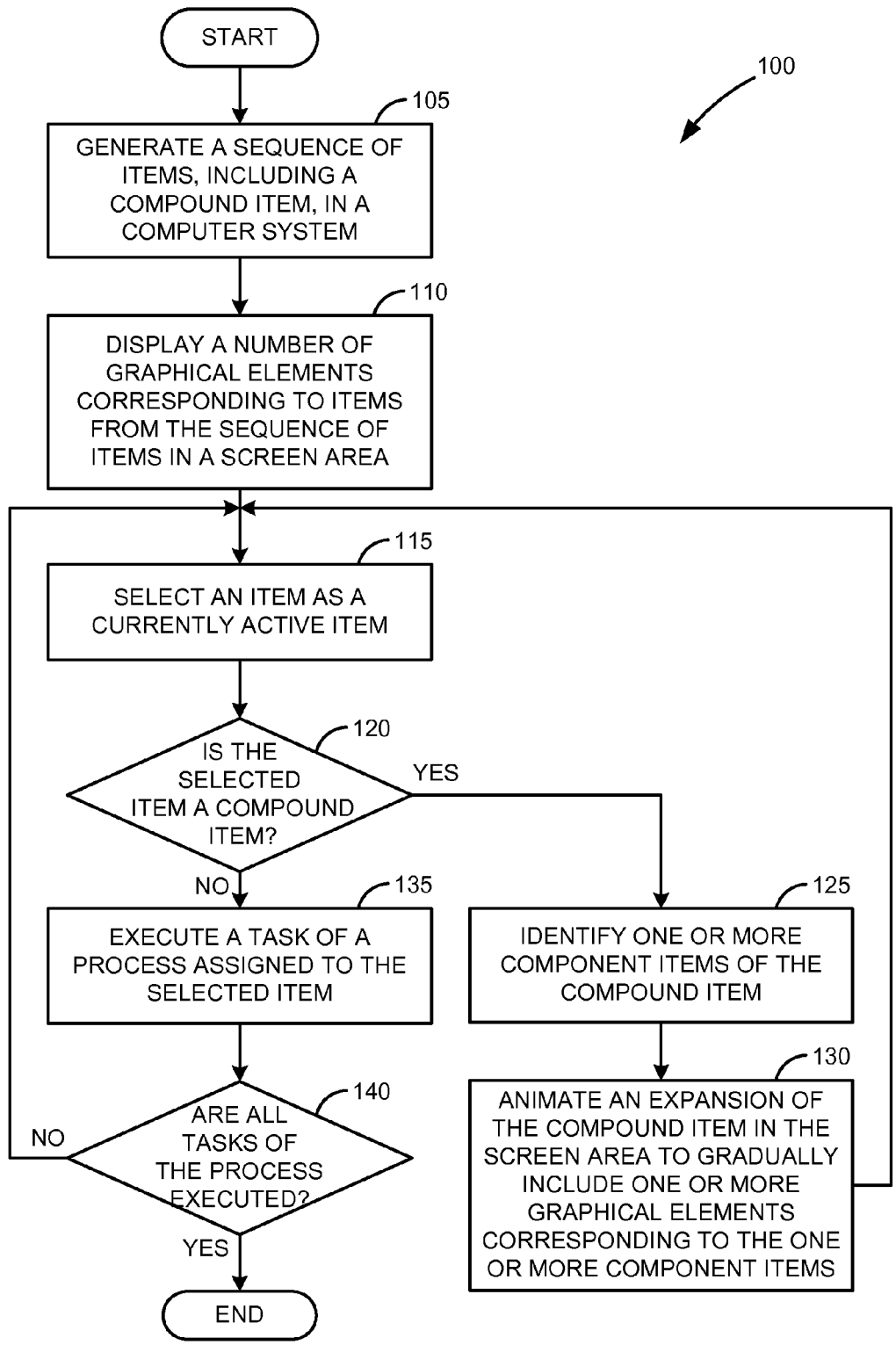
FIG. 1 illustrates a process for nested roadmap information navigation within a graphical user interface (GUI), according to one embodiment of the invention.

FIG. 1 illustrates process 100 for nested roadmap information navigation in a GUI. Process 100 starts at 105 where a sequence of items is generated in a computer system. An "item" may be used to refer to an information object in a broad sense. For example, an item could be a programming object, a textual word or a sign, an electronic table cell, a picture, etc. Generating a sequence of items is a preliminary action that could be performed long before the execution of the rest of the actions of process 100. The sequence of items could be generated dynamically at a user request; it could be generated during development of an application; it could be received from another computer system; etc. The sequence of items is stored in a dynamic memory of a computer system coupled with the GUI.

In one embodiment of the invention, one or more tasks of a particular business process are assigned to one or more of the items from the sequence of items. The sequence of items could resemble a roadmap for achieving a particular business goal by encompassing a series of tasks or steps. The execution of each task assigned to an item of the roadmap will typically change the state of the completion of the process. Thus, the roadmap could mark the progress of achieving the underlying business goal. Table 1 illustrates an example of a business server page (BSP) script describing program objects, where each program object may correspond to a roadmap item. The roadmap items can be generated based on the program object and displayed in a GUI, e.g., in a client computer Internet browser:

TABLE 1

```
BSP Roadmap element
<thtmlb:roadMap>
    <thtmlb:roadMapItem state = "INACTIVE" //Level 1
        text = "1"
        tooltip = "Enter Data To Define Filters"
        onClick = "SELECT">
        hasDynamicSubLevels = "Yes"
    <thtmlb:roadMapItem state = "INACTIVE" //Level 2
        text = "1-1"
        tooltip = "QuickInfo: Step A - Name Filters"
        onClick = "SELECT"/>
        hasDynamicSubLevels = "No"
    <thtmlb:roadMapItem state = "INACTIVE" //Level 2
        text = "1-2"
        tooltip = "QuickInfo: Step B - Set Filters"
        onClick = "SELECT" >
        hasDynamicSubLevels = "Yes"
            <thtmlb:roadMapItem state = "INACTIVE"
            //Level 3
                text = "1-2-1"
                onClick = "SELECT"/>
                hasDynamicSubLevels = "No"
            <thtmlb:roadMapItem state = "INACTIVE"
            //Level 3
                text = "1-2-2"
                onClick = "SELECT"/>
                hasDynamicSubLevels = "No"
            <thtmlb:roadMapItem state = "INACTIVE"
            //Level 3
                text = "1-2-3"
                onClick = "SELECT"/>
                hasDynamicSubLevels = "No"
    </thtmlb:roadMapItem> // Closing level 3
    </thtmlb:roadMapItem> // Closing level 2
    <thtmlb:roadMapItem state = "INACTIVE" //Level 1
        text = "2"
        tooltip = "Enter Data To Select Report Area"
        onClick = "SELECT"/>
        hasDynamicSubLevels = "No"
</thtmlb:roadMap> // Closing Roadmap (Level 1)
```

In the BSP script illustrated in Table 1, "roadMap" and "roadMapItem" are BSP tags from "thtmlb" tag library developed by SAP AG. Tags "roadMap" and "roadMapItem" have attributes that could specify the roadmap and roadmap item display and behavior. For example, attribute "state" could characterize an active, e.g., current, item or step of the roadmap; an inactive step that could be selected; and a disabled step. A user cannot select or jump to a disabled item to execute a task associated with the item before a condition is satisfied, e.g., a prior action is executed. Further, "text" attribute provides a label or a title for a roadmap item or step. Attribute "tooltip" provides a text that describes an item. Tooltip text could appear in the GUI when a user moves a pointer over a graphical element that displays the item. Attribute "onClick" is used to specify an event that will be triggered when a user clicks on a graphical element with a mouse input device. Another attribute, "hasDynamicSubLevels", defines whether an item is a compound item or not. Other attributes could be used to define an item as a component item subordinate to a particular compound item. An item could be defined as a compound item even if there are no subordinate component items defined for it. Attribute "hasDynamicSubLevels" could be omitted and component items could be directly defined in the body of the compound program object.

According to one embodiment of the invention, Component items could be dynamically generated and associated with a compound item based on the exact process execution flow and user input. One group of component items could replace another group of component items associated with a particular compound item. Some of the component items subordinate to a compound item could be also compound items. Thus, the roadmap could be defined as a nested treelike structure that could be dynamically updated.

The enlisted attributes are only examples. Other attributes with different names and properties could be defined in another embodiment of the invention. Similarly, an "onSelect" attribute may specify an action that a computer system executes when an item is selected. One of ordinary skill in the art would recognize that other approaches to define roadmap items and to assign tasks to the items could be implemented. Different development technologies and libraries of other vendors could be utilized to generate a sequence of items in broad sense.

At 110, a number of similar graphical elements are displayed in a specified screen area of a GUI. In this document, a graphical element means an object presented on a display device rendering a GUI. In other words, in this document, a graphical element means a user interface (UI) element. Each of the displayed graphical elements represents an item of the sequence of items stored in the memory. In one embodiment of the invention, the displayed graphical elements represent wholly or partially the sequence of items. The sequence of items could be regarded as a roadmap for accomplishing a particular business process by executing the tasks associated to the items from the sequence. The GUI provides information and guidance to assist a user during the accomplishment of the process by displaying the graphical elements corresponding to roadmap items and the assigned tasks. Thus, the user is able to monitor work progress, e.g., to review already executed tasks and to browse the upcoming steps.

Often, the number of items in the sequence is greater than the number of the displayed graphical elements within a single screen. The generated sequence usually includes a considerable number of items, and if too many graphical elements are displayed in a single screen, users could get confused and disoriented. The displayed graphical elements provide details regarding the corresponding items and the assigned tasks, according to one embodiment of the invention. The details could include information for the names of the tasks, descriptions or instructions for execution, statuses of the items, the order of the items, etc. In one embodiment of the invention, an efficient GUI displays between five and ten items from the sequence of items in a single screen by using corresponding graphical elements. A compound graphical element could be illustrated in the GUI screen by displaying a modified graphical element corresponding to the compound item, according to one embodiment of the invention.

In a case where the displayed graphical elements are fewer than the items in the generated sequence, the GUI could provide scrolling functionality. Thus, a scrolling is requested to change the set of the displayed items in the screen area and show one or more new graphical elements representing one or more new items from the sequence. The direction where the new graphical elements appear is the direction of scrolling, and it could be specified in the scrolling request. The scrolling could be requested by a user directly in the GUI by utilizing various input devices, including a keyboard, a mouse, a touch screen, etc. For example, scrolling could be requested by using arrows keys of a keyboard; or by moving a mouse pointer over a specific GUI control or area, with or without clicking on a mouse button, or rotating a scroll wheel or a scroll ball. Additionally, scrolling could be requested by a system process in response to a specific event, for example, in response to accomplishment of a task execution.

According to one embodiment of the invention, the scrolling in a requested direction is possible only if there is a next item in the sequence of items to be displayed by a graphical element from the direction of scrolling. Respectively, a check is performed to determine whether such next item exists. If next item to be displayed at the requested direction of scrolling exists, GUI could animate a gradual movement of the graphical elements in a direction opposite to the direction of scrolling. The animated gradual movement creates a visual effect for a smooth, e.g., without perceptible jumps, shift or flow of the displayed graphical elements towards the edge of the GUI screen that is opposite to the direction of scrolling. The result of the smooth animation is a user perception for continuing movement along the roadmap of items. As a consequence of this movement, a new graphical element representing the next item may appears from the direction of scrolling, and is gradually included in the display screen with the pace of the animated movement. The perception for "gradually" or "gradual" move of the displayed graphical elements could be created by fast continuous change of the contents of the GUI screen. The appearance of the displayed graphical objects changes by a fraction at a time commensurate with the size of a pixel, imperceptible for a human eye at the speed of change.

A GUI screen allows the display of a limited number of graphical elements. Respectively, including a new graphical element from one direction could result in excluding an existing graphical element in opposite direction during the smooth movement along the roadmap. Accordingly, an existing graphical element may be gradually excluded from the roadmap screen area depending on factors like the number of currently displayed graphical elements, the distribution of the graphical elements in the screen, the continuation of the animated smooth movement, etc.

The animation effect for a gradual movement along the roadmap could be further strengthened by additional visual effects. In one embodiment of the invention, the new graphical elements appear in emerging mode in the screen. The emerging mode could be characterized by visual effects, including gradual shift from different levels of transparency to opacity, or gradually changing the contours of the new graphical elements from dimmed to rich colors. The new graphical elements emerge during smooth animated movement, while or after being gradually included in the screen area. Similar to the visual effect of emerging, the exclusion of old elements from the screen area could be strengthened with applying a fading mode to create a visual effect opposite to the effect created with applying the emerging mode. When fading, old graphical elements could gradually change its appearance from opacity to different levels of transparency, or the contours of the fading graphical elements could lighten or dissolve from rich to washy colors.

Process 100 continues at 115 with selecting an item as an item of interest or as a currently active item. There are different ways to select an item as a currently active item. For example, a user could use a keyboard, a mouse, or some other input device to directly click on a graphical element representing the item, and thus selecting the item. In another example, a user may click on a button or enter data in another screen area of the GUI that could lead to an item selection. Alternatively, an item could be selected without a user action, as a result of a system event. One of ordinary skill in the art may recognize a number of other possible ways to receive a selection or assign interest to a particular item from the sequence of items stored in a system memory. If displayed, graphical element representing the currently active item could be modified to indicate the selection. The modification of the graphical element could include different visual effects, e.g., change of element's borders, change of colors, change of size, etc.

At 120, a check is performed to determine whether the selected item is a compound item. If the selected item is a compound item, at 125, one or more component items are identified as subordinate to the currently active compound item. In one embodiment of the invention, the subordinate component items could be dynamically generated when the compound item is selected. Alternatively, different component items could be dynamically generated and associated with a compound item in correspondence with a system event or a user input regarding an execution of a task assigned to an item from the sequence of items. In a most simple scenario, the subordinate component items are predefined together with their parent compound items.

When a component item is selected, and one or more component items are identified, the graphical element representing the compound item starts to expand gradually at 130. In one embodiment of the invention, a smooth animation visual effect creates a user perception of gradual expansion of the graphical element along the displayed roadmap to open space within the graphical element to display new graphical elements that are subordinate to the selected compound item. The expansion of the graphical element leads to the gradual inclusion of one or more new graphical elements. The new graphical elements are evenly distributed in the gap created within the expanded UI element. The new graphical elements could appear within the expanding graphical element in emerging mode. The expansion of one graphical element could cause gradual movement of one or more neighboring graphical elements. Furthermore, some of the graphical elements could be gradually removed from view when there is not enough space to preserve the even distribution between the displayed graphical elements.

After the graphical element corresponding to the selected item is expanded to include one or more new graphical elements representing the subordinate items, process 100 returns to 115 to select a new item as currently active. When the check at 120 confirms that the selected item is not a compound item, a task assigned to the selected item is executed at 135, according to one embodiment of the invention. The task that is executed could be one of a series of tasks associated with an underlying business process. The tasks associated with the business process could be assigned to different items from the sequence of items. The actions of steps from 115 to 135 are repeated until, at 140, all tasks of the underlying business process are confirmed to have been executed.

Figure 2:
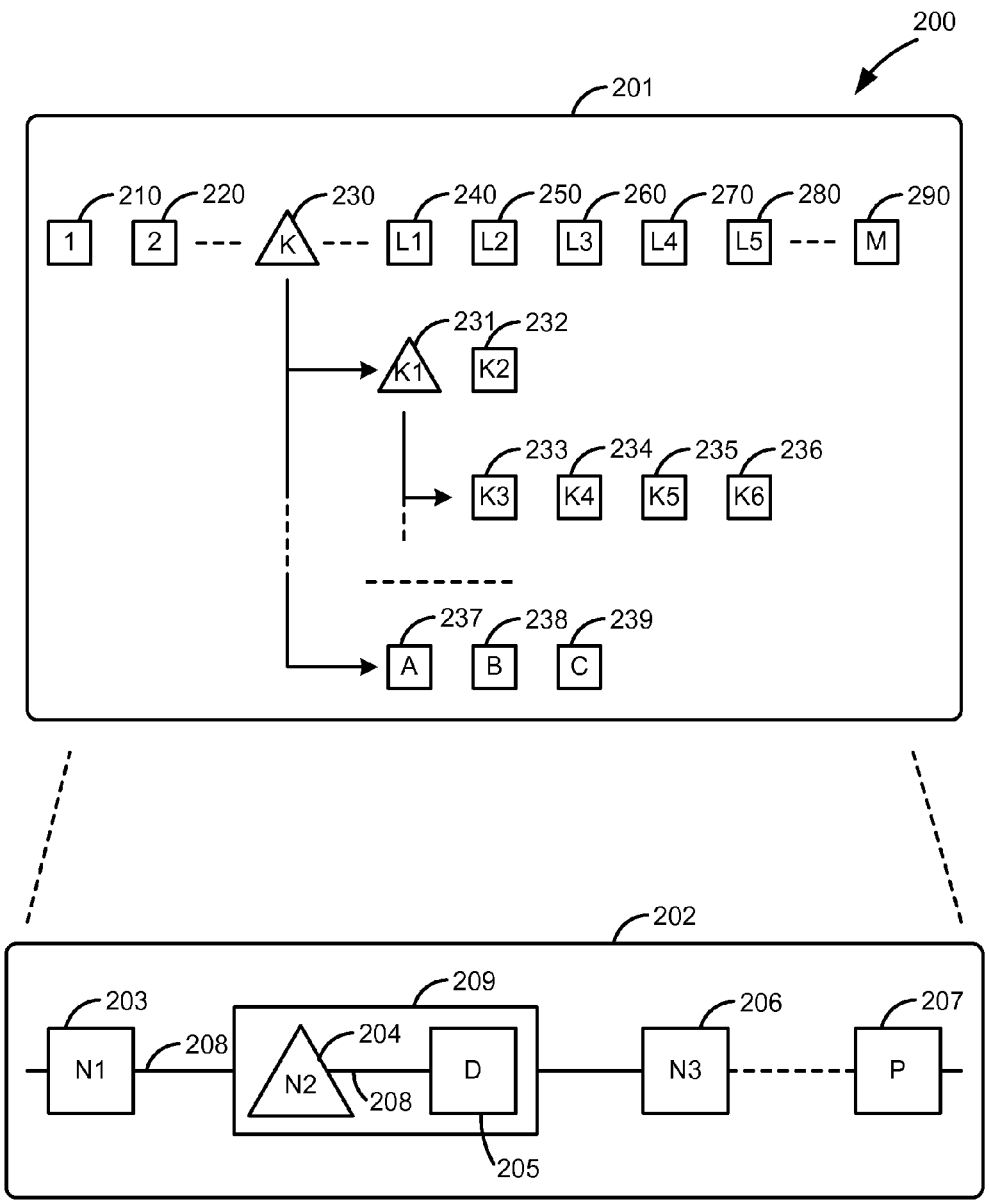
FIG. 2 is a block diagram that illustrates correspondence between a sequence of items and a number of displayed graphical elements, according to one embodiment of the invention.

FIG. 2 illustrates a correspondence between a generated sequence of items and a number of displayed graphical objects in computer system 200, according to one embodiment of the invention. Items 210 to 290 stored in memory 201 are labeled with consecutive numbers or letters to illustrate that a sequence of M items is generated. The items could be any type of information objects in a broad sense. The sequence of items could be programmed, or generated within computer system 200, or could be received from another computer system. The structure of the sequence of items as illustrated is not linear. Item 230 is a compound item that encompasses one or more groups of subordinate component items 231 to 239. Item 231 is both a component item and a compound item. This illustrates that many nesting levels are possible in the sequence of items. In one embodiment of the invention, several groups of subordinate component items could be generated as illustrated in FIG. 2. Which one of the two groups of component items, 231 to 236 or 237 to 239, is associated with compound item 230 at a particular moment depends on a predefined condition. Alternatively, all component items 231 to 239 are associated with compound item 230, or, a new group of component items associated with compound item 230 could be dynamically generated within computer system 200 based on system events, conditions, or user input.

Graphical elements 203 to 207 are displayed within GUI screen area 202 on a display coupled to memory 201. Graphical elements 203 to 207 are labeled with numbers and letters to illustrate that a number of P items from sequence of items 210 to 290 are displayed in screen area 202. Usually, the number of P elements displayed represents a sub-set of the sequence of M items. Each of graphical elements 201 to 207 corresponds to a separate item from sequence of items 210 to 290. According to one embodiment of the invention, consecutive graphical elements 231 to 235 correspond to a P number of consecutive items from the sequence of M items 210 to 290 stored in memory 220. As illustrated, graphical elements 201 to 207 are connected by line 208 to resemble a roadmap wherein each graphical element represents a particular task or activity assigned to the corresponding item.

A user could scroll along the displayed roadmap in order to review all items from the sequence of items, no more than P number of items at a time. The notion for tree-like structure of the sequence of items 210 to 290 stored in memory 201 is represented on GUI screen area 202 by expanded graphical element 209. Expanded graphical element 209 and graphical element 204 correspond to compound item, e.g., to item 230. Graphical element 205 is displayed within the expanded graphical element 209 and corresponds to a component item subordinate to the compound item. For example, graphical element 209 corresponds to one of the items 231 to 239.

Referring back to process 100 shown in FIG. 1, a sequence of items is stored in a computer memory at 105. At 110, a set of the sequence of items is displayed in a GUI screen area by corresponding graphical elements. Usually, when a user executes a task assigned or related to an item of the sequence of items, it is convenient to have a ready access to as much of the relevant information for the item as possible. According to one embodiment of the invention, intelligent and efficient information navigation in a GUI could automatically scroll displayed graphical elements to show a particular item of interest within a specified focal position of the screen area. Thus, a user will always have an overview of the currently active item and its neighboring items in the sequence of items. The user is able to follow the progress of execution of a particular process associated with the sequence of items without a necessity of additional checks and scroll requests.

Figure 3:
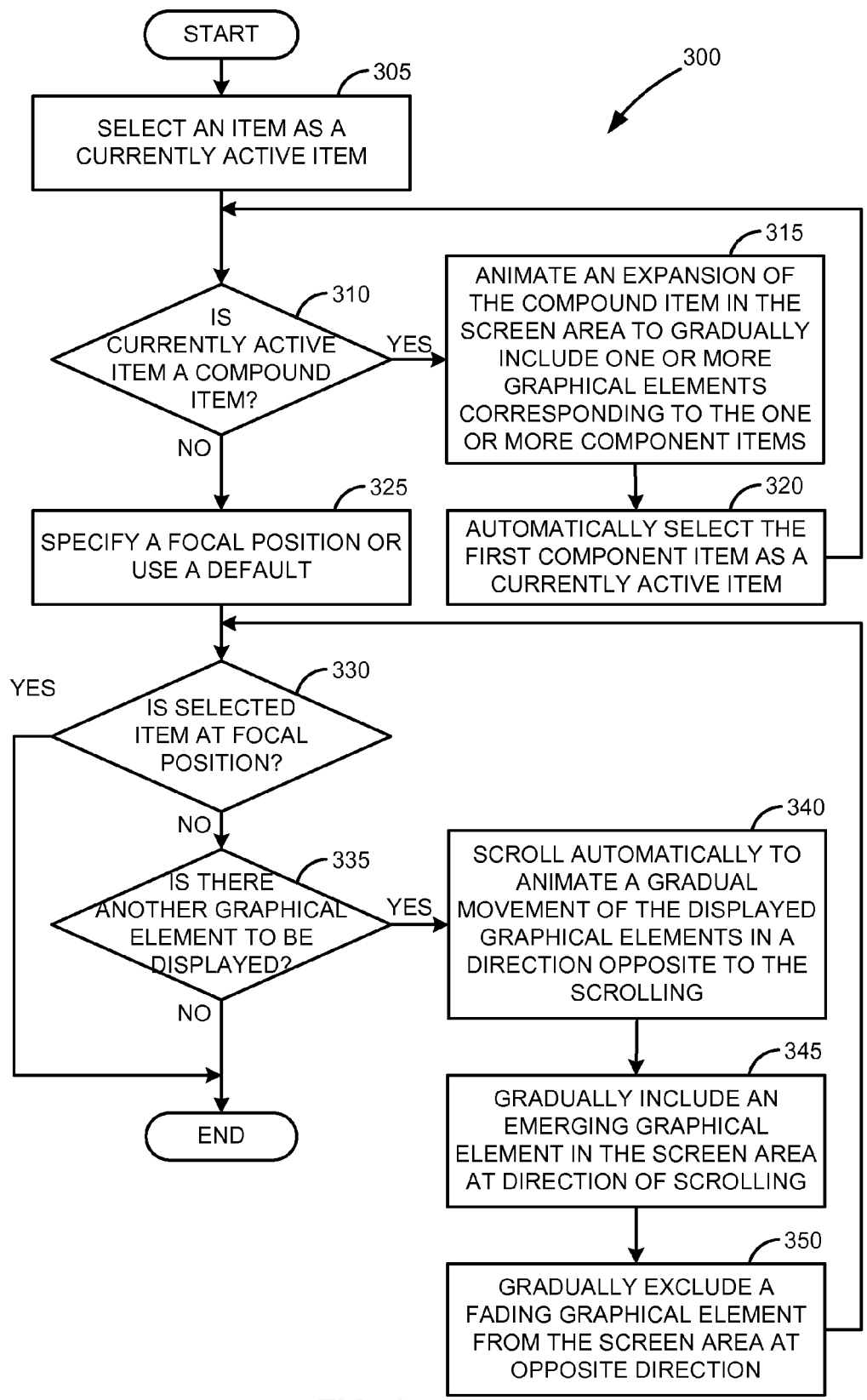
FIG. 3 illustrates a process for automatic scrolling in a GUI screen a nested graphical element to a predefined focal position, according to one embodiment of the invention.

FIG. 3 illustrates process 300 for automatic scrolling of nested graphical elements in a GUI screen area, where the graphical elements represent items from a sequence of items stored in a system memory. The automatic scrolling is performed until a graphical element corresponding to a particular item of interest is moved to a predefined focal position of the GUI screen, according to one embodiment of the invention. Process 300 starts at 305 with selection of an item from the sequence of items as a currently active item, or item of interest. If, at 310, the currently active item is confirmed to be a compound item, the first subordinate component item is automatically selected as the currently active item at 320. In other words, when the selected item is a compound item, the selection automatically shifts to a component item that is subordinate to the compound item.

When the compound item is displayed by a corresponding graphical item, at 315, the compound item visually expands to gradually open space within itself to include one or more graphical elements representing one or more subordinate items. The actions illustrated with blocks 315 and 320 are repeated while a compound item is selected as a currently active item. When, at 310, the selected item is confirmed as not being a compound item, process 300 continues at 325 with specifying a focal position in the GUI screen area. This could be a preliminary action performed at an earlier stage during development or setup of an application or of the GUI. If action 325 is omitted then a default focal position could be automatically assigned. The focal position could be specified using different terms. For example, the size and location of the focal position could be defined proportioned to the GUI screen area dimensions. Alternatively, the focal position could be defined in correlation with the number and the distribution of the displayed graphical elements.

At 330, a check is performed to determine whether a graphical element corresponding to the selected item is displayed at the specified focal position. If not, the currently displayed graphical elements are automatically scrolled to gradually move the selected graphical element to the focal position. In one embodiment of the invention, the scrolling starts only if, at 335, it is confirmed that a next, not currently displayed item exists in the direction of scrolling. At 340, the scrolling is started and the GUI animates a smooth movement of the displayed graphical elements in a direction opposite to the direction of scrolling. During the scrolling, at 345, an emerging new graphical element representing the next item is gradually included in the display screen area from the direction of scrolling. Respectively, at 350, the first graphical element displayed in a direction opposite to the direction of scrolling could be gradually removed from the screen area if there is not enough space. This graphical element could change its appearance in a fading mode as it is removed from the display screen area, according to one embodiment of the invention.

The smooth animation creates a visual effect of gradual movement of the displayed graphical elements. In one embodiment of the invention, the check at 335 for a next item to be displayed is not required. Thus, even if there is no next item, the displayed set of items will move until the graphical element representing the selected item reaches the focal position. The movement continues until, at 330, it is confirmed that the selected graphical element is displayed at the focal position. The action corresponding to block 345 will be performed only if there is a next item to be displayed during the scrolling.

Figure 4A:
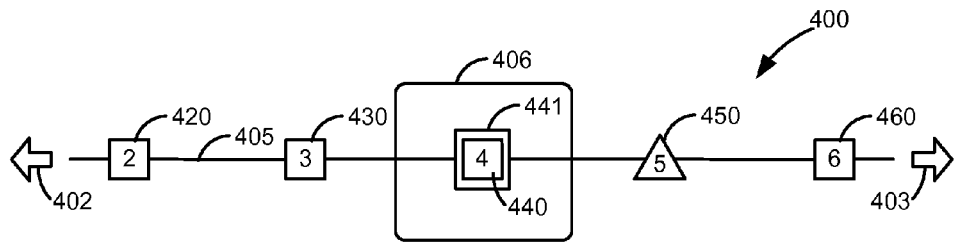
FIG. 4A is a block diagram that illustrates a GUI screen and a focal position to display a number of graphical elements, according to one embodiment of the invention.

FIG. 4A to FIG. 4E are block diagrams showing a GUI screen that display a number of nested graphical elements to illustrate automatic gradual scrolling, where the graphical elements representing items from a sequence of items are stored in a system memory. The scrolling is triggered by selecting an item from the sequence of items, according to one embodiment of the invention. FIG. 4A shows an initial view of horizontal roadmap 400 displayed in a roadmap screen area of the GUI. Roadmap 400 includes graphical elements 420, 430, 440, 450 and 460, connected with line 405. Elements 420 to 460 are labeled according to the order of the corresponding items in the sequence of items. Instead of labeling each element with a consecutive number, a particular caption, a name or a description could be displayed within or next to one or more graphical elements in the roadmap screen area. Left arrow 402 and right arrow 403 are GUI controls that could be selected by a user to request scrolling of displayed graphical elements 420 to 460 towards left or right of the screen area.

Roadmap 400 includes focal area 406 defining a focal position. Focal area 406 and its boundaries, as illustrated in FIG. 4A, are not necessarily distinctive or visible. Focal area 406 could be specified with concrete dimensions relative to the dimensions of the GUI area where roadmap 400 is displayed. Alternatively, focal area 406 could be specified in correlation with the displayed graphical elements 420 to 460. For example, focal area 406 corresponds to the middle graphical element of the evenly displayed graphical elements. Thus, for every item displayed in focal area 406, a certain number of previous and next items will be represented by corresponding graphical elements, available to a user in a same screen. As illustrated in FIG. 4A, graphical element 440 is surrounded by square 441 to indicate that graphical element 440 represents the currently active item, e.g., corresponds to the selected item, and respectively is the currently selected graphical element. Graphical element 440 is displayed at a focal position within focal area 406, as representing the item of interest.

Figure 4B:
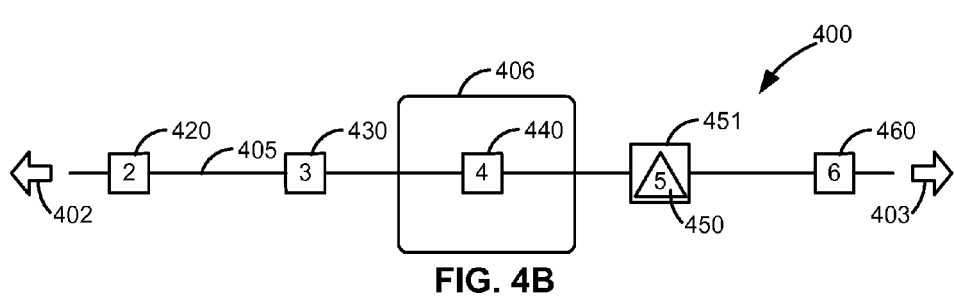
FIG. 4B is a block diagram that illustrates a GUI screen and a focal position to display a number of graphical elements, according to one embodiment of the invention.

FIG. 4B shows roadmap 400 where graphical element 450 is illustrated as surrounded by square 451 to indicate that the selection is shifted from the item corresponding to graphical element 440 to the item corresponding to graphical element 450. Furthermore, graphical element 450 is modified compared to the rest of the illustrated graphical elements 420 to 460 to indicate correspondence to a compound item. The selection of the compound item corresponding to graphical element 450 automatically triggers three actions. One of the actions is to scroll displayed graphical elements 420 to 460 along line 405 to place graphical element 450 within focal area 406. Another action is to expand graphical element 450 to open space for displaying new graphical objects corresponding to subordinate items. The third automatically triggered action is to shift the selection from the compound item corresponding to graphical element 450 to one of the component items subordinate to the compound item. The three automatically triggered actions could be executed simultaneously, according to one embodiment of the invention.

Figure 4C:
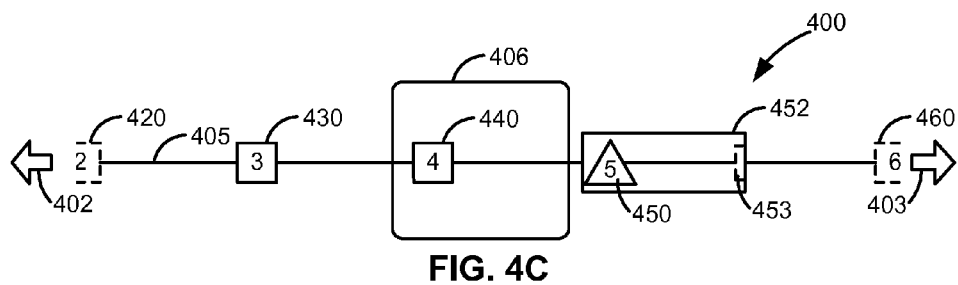
FIG. 4C is a block diagram that illustrates a GUI screen and a focal position to display a number of automatically scrolling graphical elements, according to one embodiment of the invention.

FIG. 4C illustrates automatically scrolling graphical elements 420 to 460 of roadmap 400 along line 405. The scrolling creates a visual effect of a gradual movement of the visualized graphical elements in a direction that will bring selected graphical element 450 within focal area 406. Further, FIG. 4C shows expanding graphical element 452 that surrounds graphical element 450 and indicates a smooth gradual expansion of graphical element 450 to open space and include new graphical element 453. The combination of automatic scrolling and expansion of graphical element 450 could cause graphical elements 420 to 460 to move in different directions along line 405 as illustrated in FIG. 4C. Graphical elements 420 and 460 are close to the opposite edges of the roadmap screen area. In order to preserve the even distribution of graphical elements 420 to 460 along line 405, the resulting movement of the graphical elements leads to gradual removal of border graphical elements 420 and 460 from the GUI screen. In FIG. 4C, graphical elements 420 and 460 are drawn with dashed lines to indicate that the elements are gradually removed in the fading mode. Also, graphical element 453 is drawn with dashed lines to indicate that it is gradually included in the emerging mode. Thus, graphical elements 420, 460 and 453 could gradually change colors and transparency level to strengthen the visual effect of motion.

Figure 4D:
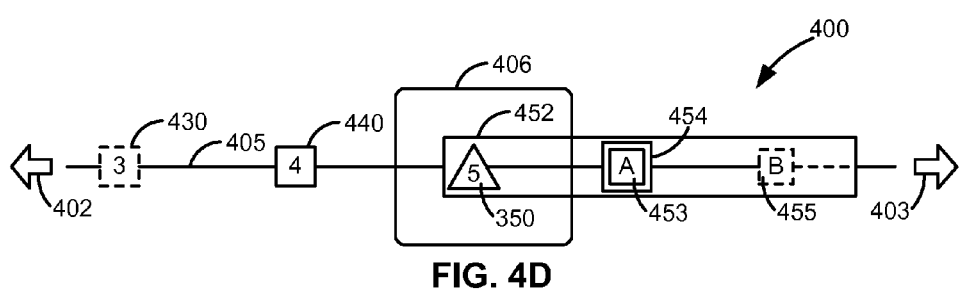
FIG. 4D is a block diagram that illustrates a GUI screen and a focal position to display a number of automatically scrolling graphical elements, according to one embodiment of the invention.

FIG. 4D shows roadmap 400 where graphical element 452, and respectively, graphical element 450, further expand and move along line 405. The expansion causes graphical element 455, corresponding to a next item of a group of component items subordinate to the compound item 450, to be included within graphical element 452. Graphical element 453 corresponding to a first item of the group of subordinate items is surrounded by square 454 to indicate an automatic shift of the selection from the compound item to this item. As a result, the graphical elements scroll simultaneously with the expansion to place the selected graphical element 453 in the focal area

406. In order to preserve the even distribution of the displayed graphical elements, border graphical element 430 moves towards the edge of roadmap 400, and could be gradually removed from view. Graphical element 430 is drawn with dashed lines to indicate that is gradually removed in fading mode, according to one embodiment of the invention. New graphical element 455 is drawn with dashed lines to indicate that is gradually included in emerging mode.

Figure 4E:
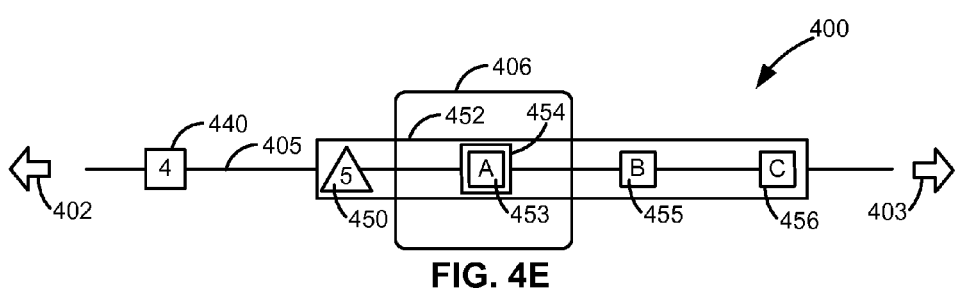
FIG. 4E is a block diagram that illustrates a GUI screen and a focal position to display a number of graphical elements, according to one embodiment of the invention.

FIG. 4E illustrates roadmap 400 where the motion and the expansion of the displayed graphical elements is completed. Graphical element 452 surrounding graphical element 450 has expanded to include new graphical elements 453, 455 and 456. The new graphical elements correspond to component items subordinate to the compound item 450. Square 454 indicates that graphical element 453 is selected, e.g., corresponds to the currently active item. Displayed graphical elements 440 to 456 are evenly distributed along line 405 to display graphical element 453 at focal position within focal area 406. In one embodiment of the invention, the graphical elements that correspond to subordinate items could have an appearance that visually distinguishes them from graphical elements representing items on a higher level in the sequence of items. Thus, the display logic of the graphical elements could strengthen the visual representation of nested structure. For the same purpose, the distribution of graphical elements corresponding to subordinate items along line 406 could differ compared to the distribution of the other graphical elements.

FIG. 5 is a block diagram of GUI 500 including roadmap area 505 and task work area 525. A set of nested consecutive items from a generated sequence of items is displayed as roadmap 400 in roadmap area 505. The items from the set of items are represented by corresponding graphical elements. The sequence of items is stored in a computer system memory coupled to the GUI. The sequence of items could correspond to a process and where each or some of the items are assigned to represent separate steps or tasks of the process. The process could be accomplished by executing the assigned tasks. Task work area 525 displays an interface corresponding to a task assigned to a currently selected item from the sequence of items. The selected item is a currently active item or item of interest. The position of the currently active item within the sequence of items could mark the progress of the accomplishment of the process.

Task work area 525 displays an interface to retrieve and enter information pertinent to the execution of the task that is associated with the currently selected item. For convenience, roadmap area 505 automatically opens nested structures of roadmap 500 and scrolls to place a graphical element corresponding to the currently active item within focal area 515. Thus, the user will have an overview and a guidance of the underlying process, including the current task, the level of the current task within the tree-like nested structure of the sequence of items, the recently accomplished tasks and the forthcoming tasks. The intelligent automatic scrolling saves the users unnecessary scrolling requests. The users could use GUI controls to request scrolling of the displayed graphical elements in the roadmap screen area to review any item from the sequence of items. When the GUI focus is changed to task work area 525 from another area, the set of displayed items (e.g., their corresponding graphical elements) scroll automatically to place the graphical element corresponding to the currently active item within focal area 515.

In one embodiment of the invention, the user could accomplish the task assigned to the currently active item using the interface displayed in task work area 525. When the task assigned to the currently active item is accomplished, a next item from the sequence of items is selected automatically as currently active item. When the next selected item is a compound item, the selection is shifted automatically to an item subordinate to the compound item. The component items subordinate to the compound item could be generated or identified when the compound item is selected as currently active.

The graphical elements in roadmap area 505 scroll and expand automatically towards the next currently active item to move the corresponding graphical element in focal area 515. Task work area 525 displays the interface corresponding to the task assigned to the next currently active item. The user could scroll the displayed graphical elements and directly select an item, e.g., by clicking on the corresponding graphical element. Thus, the user could jump to execute a task or edit a previous execution of a task without being faithful to the order of the sequence. However, in various embodiments, one or more of the items may not be selectable for execution out of order. If there is no next item to be automatically selected, the underlying process associated with the sequence of item is reported as being accomplished.

GUI 500 further includes label area 510 and toolbar area 520, according to various embodiments of the invention. Information associated with one or more of the graphical elements are displayed in the label area 510. The information in label area 510 could provide data that is helpful for the user during the execution of the tasks assigned to the items from the sequence of items. For example, label area 510 could include the names of the tasks assigned to the displayed graphical elements. Label area could also show information regarding the order in the sequence of the items that are displayed with corresponding graphical objects, tooltips, instructions regarding the assigned actions, etc. Label area 510 could be adjacent to, or even intersect with roadmap area 505. Toolbar area 520 provides access to one or more commands pertinent to the items displayed in roadmap area 505, or pertinent to the interface displayed in task work area 525. According to one embodiment of the invention, toolbar area 520 displays one or more command options selectable by a user in order to initiate a desired action. Examples for possible commands in toolbar area 520 include "go to a previous task", "go to next task", "save data on a disk", "change view", etc.

Figure 6A:
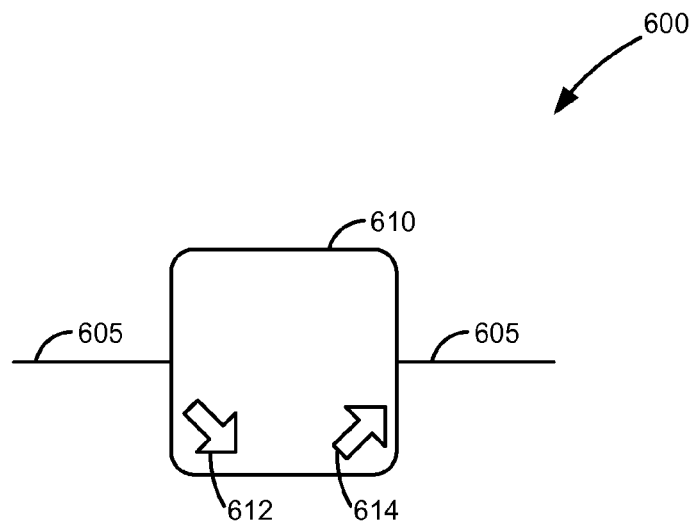
FIG. 6A is a block diagram of a graphical element corresponding to a compound item, according to one embodiment of the invention.

FIG. 6A shows graphical element 610 displayed in GUI screen 600. Graphical element 610 is shaped as a rounded square, according to one embodiment of the invention. Graphical element 610 includes two arrow shaped indicators (e.g., 612 and 614) to indicate that the item 610 is a compound item and has one or more subordinate items. Indicators 612 and 614 suggest that component items subordinate to the compound item corresponding to graphical element 610 could exist. Graphical element 610 is displayed along line 605 to resemble a roadmap object. Arrow indicators 612 and 614 are inclined downwards and upwards relative to line 605 to suggest that nested items subordinate to the compound items might exist, according to one embodiment of the invention.

Figure 6B:
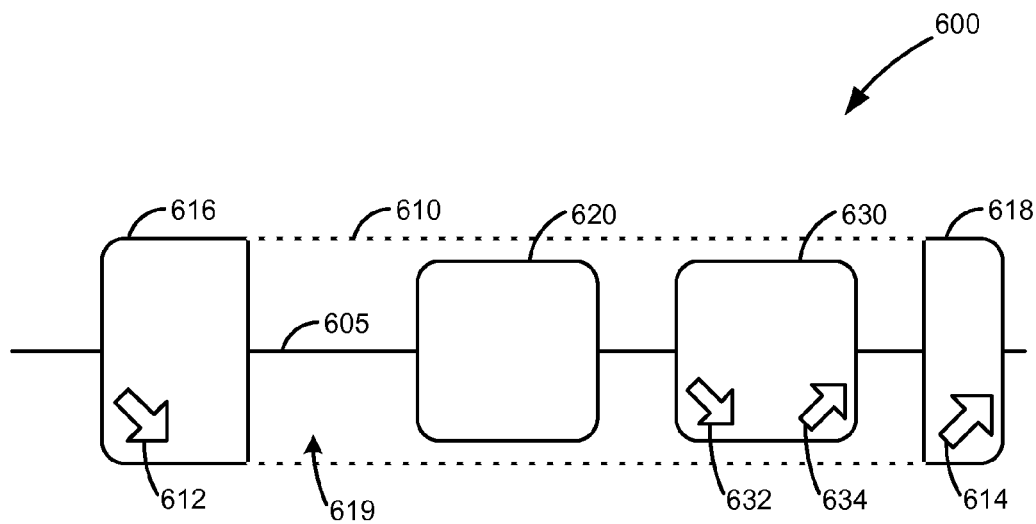
FIG. 6B is a block diagram of an expanded graphical element corresponding to a compound item, according to one embodiment of the invention.

FIG. 6B shows graphical element 610 in expanded state displayed in GUI screen 600. When expanded, graphical element 610 is vertically split in two halves 616 and 618. Left half 616 includes modification 612, and right half 618 includes modification 614. Two halves 616 and 618 of graphical element 610 are horizontally separated along line 605 to form gap 619. Within gap 619 and along line 605, graphical elements 620 and 630 corresponding to component items subordinate to the compound item corresponding to graphical element 610 are displayed. Even if GUI screen 600 is not big enough to show simultaneously the two halves 616 and 618 of graphical element 610, indicators 612 or 614 indicate nested structure. The downward arrow of indicator 612 will orient a user that the following UI elements represent component items that are subordinate to the compound item 610. Respectively, the upward arrow of indicator 614 will orient a user that the preceding UI elements represent component items that are subordinate to the compound item 610.

The visualization of nesting could be further illustrated by using graphical elements with different size and color to display items on different hierarchical levels in the sequence of items. Further, gap 619 could be highlighted or shaded to distinguish the area of nesting in displayed roadmap, etc. Graphical element 630 is modified with arrow shaped indicators 632 and 634 to indicate correspondence to a compound item that is also a component item subordinate to compound item represented by graphical element 610.

Figure 7:
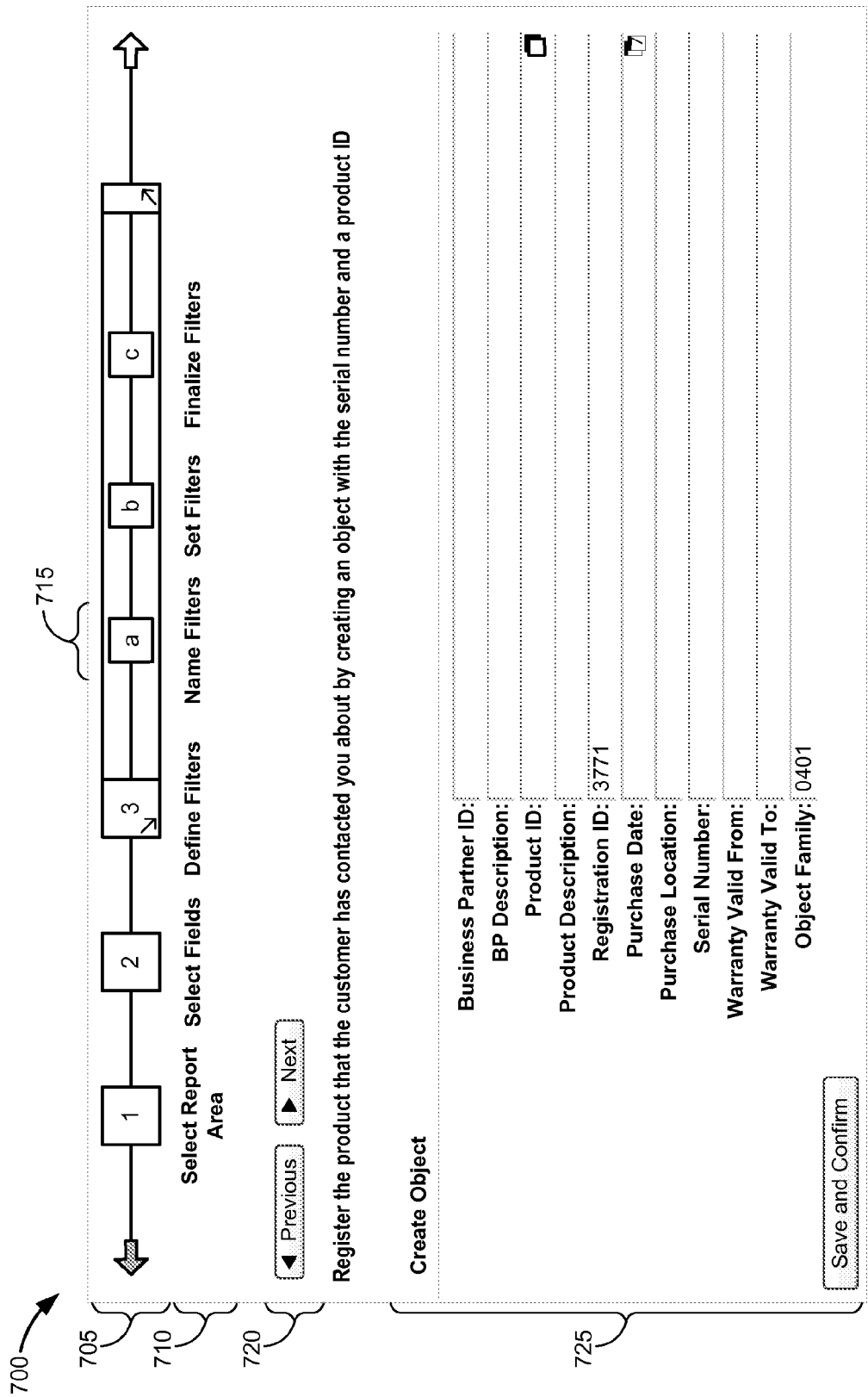
FIG. 7 is a screenshot of a GUI for nested roadmap information navigation, according to one embodiment of the invention.

FIG. 7 is a screenshot of GUI 700 for nested roadmap information navigation, according to one embodiment of the invention. GUI 700 includes horizontal roadmap area 705 where a number of UI elements are displayed. The displayed UI elements represent items of a sequence of items. Roadmap area 705 includes focal area 715 that is specified relative to the evenly distributed UI elements displayed in roadmap area 705. A UI element representing a selected item is automatically scrolled to be placed in focal area 715 when the scrolling is possible, e.g., when a next item that is not displayed exists in a direction opposite to the scrolling. Roadmap area 705 displays nested graphical objects corresponding to nested items from the sequence of items by using modifications to mark graphical elements corresponding to compound items. A graphical element representing a compound item is automatically expanded when selected to include new graphical elements representing the subordinate component items. The selection is shifted automatically to the subordinate items.

GUI 700 includes task work area 725 to provide interface to a user to execute a task assigned to the currently selected item. Label area 710 provides the name of the tasks assigned to the items that are displayed by the graphical elements. Toolbar area 720 includes controls selectable by a user to perform particular actions. In the provided example, toolbar area 720 includes "previous" and "next" button controls that help a user to select previous or next item from the sequence of items relative to the currently selected item.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable medium as instructions. The term "computer readable medium" should be taken to include a single medium or multiple media that stores one or more sets of instructions. The term "computer readable medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 8:
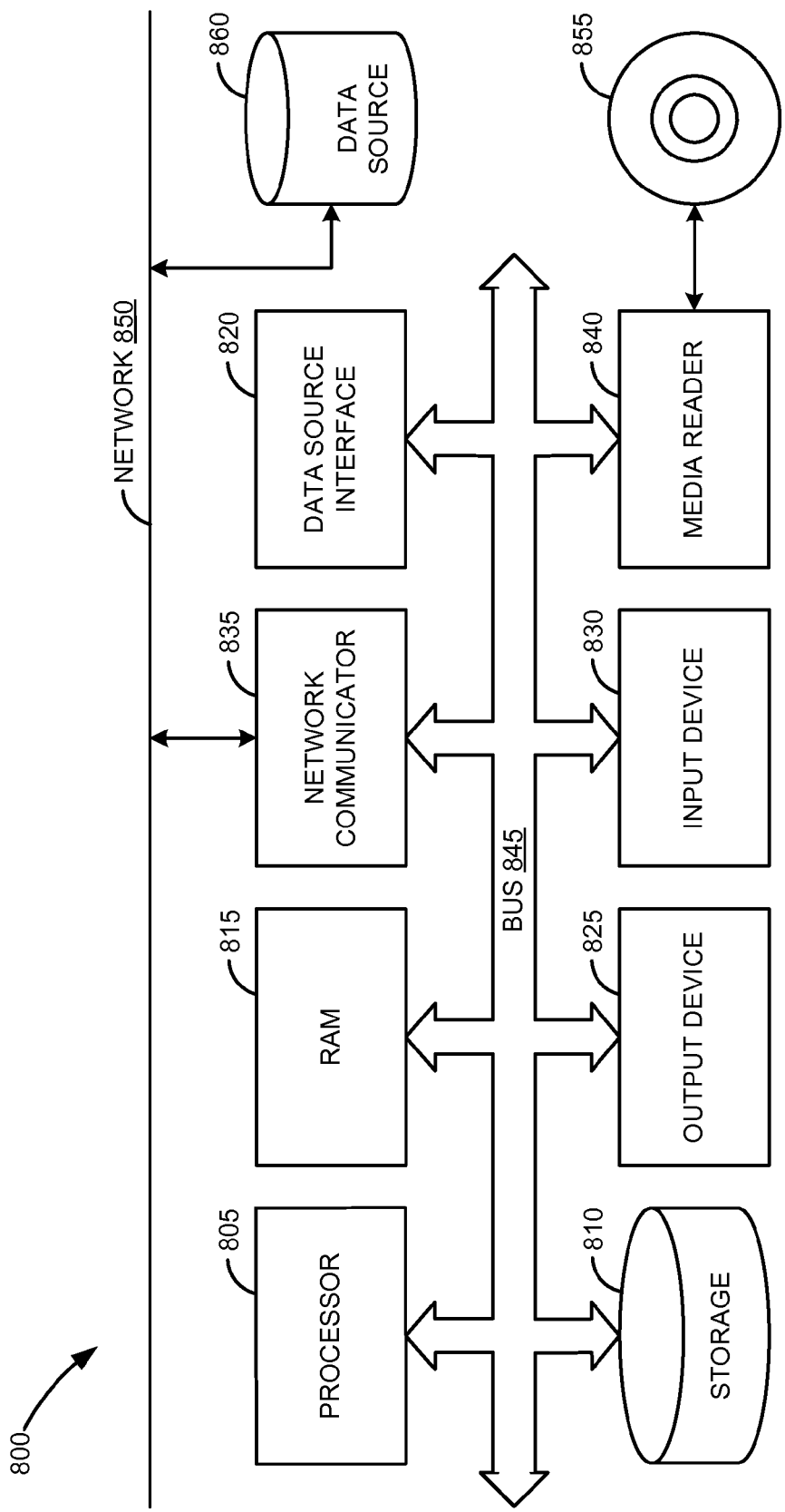
FIG. 8 is a block diagram of an exemplary computer system to execute computer readable instructions for nested roadmap information navigation, according to one embodiment of the invention.

FIG. 8 is a block diagram of an exemplary computer system 800. The computer system 800 includes a processor 805 that executes software instructions or code stored on a computer readable medium 855 to perform the above-illustrated methods of the invention. The computer system 800 includes a media reader 840 to read the instructions from the computer readable medium 855 and store the instructions in storage 810 or in random access memory (RAM) 815. The storage 810 provides a large space for keeping static data where at least some instructions could be stored for later execution. The stored instructions may be further compiled to generate other representations of the instructions and dynamically stored in the RAM 815. The processor 805 reads instructions from the RAM 815 and performs actions as instructed. According to one embodiment of the invention, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be access via one or more abstraction layers implemented in hardware or software. For example, the data source 860 may be access by network 850. In some embodiments the data source 860 may be accessed via an abstraction layer, such as, a semantic layer.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A non-transitory computer readable medium having computer readable instructions stored thereon for execution by a processor to perform a method for nested roadmap information navigation, the method comprising:
    storing a sequence of items in a memory of a computer system, wherein the sequence of items includes a compound item;
    displaying a process roadmap including a plurality of user interface (UI) elements in a first area of a graphical user interface (GUI) screen associated with the computer system, wherein each UI element represents one or more items of the sequence of items including the compound item, and wherein the UI elements are displayed in an order corresponding to an order associated with the sequence of items, displaying the process roadmap including the plurality of UI elements comprises:
        displaying the plurality of UI elements as a horizontal sequence of graphical objects,
        displaying a label next to or within a UI element of the plurality of UI elements, wherein the label indicates a position of a corresponding item in the sequence of items, and
        displaying the UI element representing the compound item as a modified graphical object in the horizontal sequence of graphical objects;
    automatically scrolling the plurality of UI elements to move a UI element representing a selected as currently active item of the sequence of items in a focal area of the GUI;
    receiving a selection of the compound item as currently active item;
    in response to receiving the selection, dynamically generating at least one component item subordinate to the compound item;
    expanding a UI element representing the compound item to gradually include in the first area of the GUI screen at least one new UI element representing the generated at least one component item; and
    gradually removing at least one of the plurality of UI elements displayed in the first area of the GUI screen in at least one direction of expansion of the UI element representing the compound item.

2. The computer readable medium of claim 1 having computer readable instructions stored thereon for execution by a processor to perform the method for nested roadmap information navigation, the method further comprising:
    displaying an interface corresponding to a task in a second area of the GUI screen, wherein the task is assigned to currently active item, and wherein the interface allows a user to one or more of accessing and entering data pertinent to the execution of the task.

3. The computer readable medium of claim 1, wherein storing the sequence of items comprises:
    grouping a plurality of tasks of a process for execution in the computer system; and
    assigning a task of the plurality of tasks to an item of the sequence of items.

4. The computer readable medium of claim 1, wherein dynamically generating the at least one component item comprises:
    generating the at least one component item in correspondence with a system event or based on a user input related to a previously selected item from the sequence of items.

5. The computer readable medium of claim 1, wherein expanding the UI element representing the compound item comprises:
    splitting the UI element representing the compound item in two UI half elements corresponding to the compound item;
    widening a gap between the two UI half elements by moving in opposite directions one or more of the two UI half elements; and
    gradually including the at least one new UI element representing the generated at least one component item between the two UI half elements corresponding to the compound item.

6. The computer readable medium of claim 1, wherein expanding the UI element representing the compound item comprises:
    automatically selecting one of the generated at least one component item as currently active item.

7. The computer readable medium of claim 1, wherein expanding the UI element representing the compound item comprises:
    displaying the at least one new UI element representing the generated at least one component item in emerging mode while being gradually included in the first area of the GUI screen, wherein the emerging mode includes gradual shift from different levels of transparency to opacity.

8. In a computer system coupled with a display to render a graphical user interface (GUI), a method for nested roadmap information navigation comprising:
    storing a sequence of items in a memory of the computer system, wherein the sequence of items includes a compound item;
    displaying a process roadmap including a plurality of user interface (UI) elements in a first area of a GUI screen associated with the computer system, wherein each UI element represents one or more items of the sequence of items including the compound item, and wherein the UI elements are displayed in an order corresponding to an order associated with the sequence of items, displaying the process roadmap including the plurality of UI elements comprises:
 displaying the plurality of UI elements as a horizontal sequence of graphical objects,
 displaying a label next to or within a UI element of the plurality of UI elements, wherein the label indicates a position of a corresponding item in the sequence of items, and
 displaying the UI element representing the compound item as a modified graphical object in the horizontal sequence of
 graphical objects;
automatically scrolling the plurality of UI elements to move a UI element representing a selected as currently active item of the sequence of items in a focal area of the GUI;
receiving a selection of the compound item as currently active item;
in response to receiving the selection, dynamically generating at least one component item subordinate to the compound item;
expanding a UI element representing the compound item to gradually include in the first area of the GUI screen at least one UI element representing the generated at least one component item; and
gradually removing at least one of the plurality of UI elements displayed in the first area of the GUI screen in at least one direction determined by the expansion of the UI element representing the compound item.

9. The method of claim 8 further comprising:
 displaying an interface corresponding to a task in a second area of the GUI screen, wherein the task is assigned to currently active item, and wherein the interface allows a user to one or more of accessing and entering data pertinent to the execution of the task.

10. The method of claim 8, wherein storing the sequence of items comprises:
 grouping a plurality of tasks of a process for execution in the computer system; and
 assigning a task of the plurality of tasks to an item of the sequence of items.

11. The method of claim 8, wherein dynamically generating the at least one component item comprises:
 generating at least one component item based on a user input related to a previously selected item from the sequence of items.

12. The method of claim 8, wherein expanding the UI element representing the compound item comprises:
 splitting the UI element representing the compound item in two UI half elements corresponding to the compound item;
 widening a gap between the two UI half elements by moving in opposite directions one or more of the two UI half elements; and
 gradually including the at least one new UI element representing the at least one component item between the two UI half elements corresponding to the compound item.

13. The method of claim 8, wherein expanding the UI element representing the compound item comprises:
 automatically selecting one of the generated at least one component item as currently active item.

14. The method of claim 8, wherein expanding the UI element representing the compound item comprises:
 displaying the at least one new UI element representing the generated at least one component item in emerging mode while being gradually included in the first area of the GUI screen, wherein the emerging mode includes gradual shift from different levels of transparency to opacity.

15. A computer controlled display system rendering a graphical user interface (GUI) for nested roadmap navigation, the GUI comprising:
 a process roadmap area for displaying a plurality of user interface (UI) elements, wherein each UI element represents one or more items from a sequence of items, and wherein the UI elements are displayed in an order corresponding to an order associated with the sequence of items, displaying the plurality of UI elements comprises:
  displaying the plurality of UI elements as a horizontal sequence of graphical objects,
  displaying a label next to or within a UI element of the plurality of UI elements, wherein the label indicates a position of a corresponding item in the sequence of items, and
  displaying the UI element representing the compound item as a modified graphical object in the horizontal sequence of graphical objects;
 a modified UI element from the plurality of UI elements representing a compound item from the sequence of items, wherein
  upon receiving a selection of the compound item as currently active item the modified UI element expands to gradually include at least one UI element representing at least one component item subordinate to the compound item, wherein the at least one component item is dynamically generated in response to receiving the selection,
  at least one of the plurality of UI elements displayed in the process roadmap area is gradually removed in at least one direction of expansion of the modified UI element, and
  an item of the at least one item subordinate to the compound item is selected as currently active item; and
 a focal area, wherein the plurality of UI elements scroll automatically to move a UI element representing the selected as currently active item of the sequence of items in the focal area.

16. The computer controlled display system of claim 15 rendering the GUI further comprising:
 a work area for displaying an interface corresponding to a task of a process, wherein the task is assigned to the selected as currently active item, and wherein the interface allows a user to one or more of entering and accessing data pertinent to the execution of the task.

17. The computer controlled display system of claim 15 rendering the GUI further comprising:
 a toolbar area to display at least one command option pertinent to the nested roadmap navigation.

* * * * *